(12) United States Patent
Jang et al.

(10) Patent No.: US 7,884,810 B2
(45) Date of Patent: Feb. 8, 2011

(54) UNEVENNESS DETECTING APPARATUS FOR COMPENSATING FOR THRESHOLD VOLTAGE AND METHOD THEREOF

(75) Inventors: Jin Jang, Seoul (KR); Ji-Ho Hur, Seoul (KR); Se-Hwan Kim, Seoul (KR); Seung-Hyun Park, Seoul (KR)

(73) Assignee: Silicon Display Technology Co., Ltd., Seoul (KR)

( * ) Notice: Subject to any disclaimer, the term of this patent is extended or adjusted under 35 U.S.C. 154(b) by 1289 days.

(21) Appl. No.: 11/396,951

(22) Filed: Apr. 3, 2006

(65) Prior Publication Data
US 2007/0024546 A1 Feb. 1, 2007

(30) Foreign Application Priority Data
Jul. 27, 2005 (KR) .................. 10-2005-0068515

(51) Int. Cl.
*G06F 3/045* (2006.01)
(52) U.S. Cl. ...................................... 345/174
(58) Field of Classification Search ......... 345/173–178; 178/18.06
See application file for complete search history.

(56) References Cited

U.S. PATENT DOCUMENTS

| | | | | |
|---|---|---|---|---|
| 5,194,862 A | * | 3/1993 | Edwards | 341/20 |
| 5,204,661 A | * | 4/1993 | Hack et al. | 345/88 |
| 2002/0063518 A1 | * | 5/2002 | Okamoto et al. | 313/506 |
| 2002/0190964 A1 | * | 12/2002 | Van Berkel | 345/173 |
| 2003/0076295 A1 | * | 4/2003 | Nakajima | 345/156 |
| 2005/0126831 A1 | * | 6/2005 | Richter et al. | 178/18.01 |
| 2005/0200296 A1 | * | 9/2005 | Naugler et al. | 315/150 |

FOREIGN PATENT DOCUMENTS

JP       2003-076327       3/2003

OTHER PUBLICATIONS

Jang; "Circuit and Method for Driving Organic Light Emitting Diode" U.S. Appl. No. 11/396,932, filed Apr. 3, 2006.
Jang; "Organic Light Emitting Diode Display Device and A Driving Method Thereof" U.S. Appl. No. 11/396,925, filed Apr. 3, 2006.

\* cited by examiner

*Primary Examiner*—Chanh Nguyen
*Assistant Examiner*—Robert M Stone
(74) *Attorney, Agent, or Firm*—Ladas & Parry LLP

(57) ABSTRACT

Unevenness detecting apparatus for compensating for threshold voltage and method thereof is provided with a plurality of scan lines and a plurality of data lines and a pixel circuit arranged in each point which the scan lines and the data lines are intersected. The unevenness detecting apparatus for compensating for the threshold voltage and method thereof may accurately sense a state of minute unevenness such as fingerprints by using an active element (e.g., TFT) as an element of which pixel circuit is composed.

12 Claims, 3 Drawing Sheets

US 7,884,810 B2

UNEVENNESS DETECTING APPARATUS FOR COMPENSATING FOR THRESHOLD VOLTAGE AND METHOD THEREOF

CLAIM FOR PRIORITY

This application claims priority to Korean Patent Application No. 10-2005-0068515 filed on Jul. 27, 2005, in the Korean Intellectual Property Office (KIPO), the entire contents of which are hereby incorporated by reference.

BACKGROUND

1. Field of the Invention

Example embodiments of the present invention relates in general to the field of an unevenness detecting apparatus for compensating for a threshold voltage and method thereof, which includes respective sensor pixel circuit, provided with a plurality of scan lines and a plurality of data lines and arranged on each point which the scan lines and the data lines cross are intersected, and more specifically to an unevenness detecting apparatus and method thereof that can accurately sense a state of a minute unevenness such as a fingerprint by using an active element (e.g., a thin film transistor TFT) as an element which a pixel circuit is constituted.

2. Description of the Related Art

Now, there is a fingerprint sensor as a device configured to sense a shape change of a minute unevenness. The fingerprint sensor used in this system can obtain a shape of a fingerprint as a digital image, and be largely divided into an optical type, a capacitance detection type, a thermal detection type and an ultrasonic detection type sensor. The capacitance detection type sensor among the sensors converts a capacitance change according to a distance between the fingerprint and a sensing electrode into a voltage and outputs the converted voltage as a digital signal.

FIG. 1 is an entire configuration view of an unevenness detecting apparatus configured to sense unevenness such as the fingerprint.

As illustrated in FIG. 1, a general unevenness detecting apparatus is composed of a scan line driving circuit 10 configured to transmit a select signal for selecting respective pixel 40, a pixel circuit 40 arranged on each point which the plurality of scan line 11 connected to a scan line driving circuit 10 and a plurality of data lines 21 are intersected, and a read-out circuit 30 configured to transmit a data value of a sensed voltage to a predetermined IC chip.

FIG. 2 is a circuit view illustrating the pixel circuit 40 included in an unevenness detecting apparatus used in an existing capacitance detecting method.

According to the pixel circuit illustrated in FIG. 2, a capacitance between a sensing electrode (S) which plays a role of capacitor is determined according to a distance between an object such as a fingerprint and a sensing electrode (S). Accordingly, an electric charge charged through a power supply transistor (T2) for a regular time is determined by the capacitance determined according to the distance between the sensing electrode (S) and the object.

If a select signal is applied to a N-th scan line (Gate n) 11 in FIG. 2, a switching transistor (T1) is turned on and transmits the electric charge stored in a capacitor formed between the sensing electrode and the object such as the fingerprint to the data line 21.

However, since a charge distribution is generated by a parasitic capacity of the data line 21 in a process of outputting and moving the electric charge stored in the capacitor as illustrated above, a voltage transmitted to the real read-out IC is decreased.

Accordingly, a function of charge amplification must be performed in the pixel circuit so as to compensate for decrease of the voltage due to the above parasitic capacity. FIG. 3 is a circuit view illustrating a pixel circuit of the capacitance detection type of the existing unevenness detecting apparatus which can perform charge amplification.

Referring to FIG. 3, the change of the capacitance determined according to the distance between the sensing electrode (S) and the object such as the fingerprint changes a gate voltage of a source follow transistor (T3), and if a select voltage is applied to the N-th scan line, a difference between the gate voltage and a threshold voltage of the source follow transistor (T3) is outputted.

The pixel circuit may amplify the electric charge, but change an output signal due to time or generate a fixed pattern noise, according to a spatial non-uniformity of the threshold voltage of the source follow transistor (T3) or a deterioration of characteristics due to time.

Specifically, when a TFT such as an amorphous silicon or a poly crystalline silicon transistor is used, a characteristic of the element is excessively changed. Thus, the above problem may be obvious more and more.

SUMMARY

Accordingly, the present invention is provided to substantially obviate one or more problems due to limitations and disadvantages of the related art.

Example embodiments of the present invention provide an unevenness detecting apparatus which can output an accurate and fixed pixel voltage irregardless of a detecting time and space, when an object having an unevenness such as fingerprints is detected, by forming a pixel circuit using a thin film transistor (TFT) such as an amorphous silicon or a poly crystalline silicon transistor.

In some example embodiments, an unevenness detecting apparatus for compensating for a threshold voltage variation which includes a plurality of scan lines and a plurality of data lines and a pixel circuit arranged on each point which the scan lines and the data lines are intersected, wherein the pixel circuit includes: a sensing electrode having one terminal; a first transistor having a gate terminal connected to a scan line (Gate n), a source terminal connected to the data line and a drain; a second transistor of which a gate terminal is connected to a scan line (Gate n–1) of the former terminal, a source terminal is connected to the drain terminal of the first transistor, and a drain terminal is connected to the terminal of the sensing electrode; a third transistor of which a gate terminal is connected to the sensing electrode and the drain terminal of the second transistor, a drain terminal is connected to the scan line, and a source terminal is connected to the drain terminal of the first transistor and the source terminal of the second transistor; a fourth transistor of which a gate terminal and a drain terminal is connected to the scan line (Gate n–1) of the former terminal, and a source terminal is connected to the drain terminal of the second transistor, the sensing electrode and the gate terminal of the third transistor; and a capacitor of which one terminal is connected to the gate terminal of the third transistor, the drain terminal of the second transistor, the source terminal of the fourth transistor and the sensing electrode, and the other terminal is connected to the scan line.

In other example embodiments, an unevenness detecting apparatus for compensating for a threshold voltage variation including a pixel circuit in which the fourth transistor is replaced with a diode, and provided with a plurality of scan lines and a plurality of data lines, and the pixel circuit arranged on each point which the scan lines and the scan lines are intersected, wherein the pixel circuit includes: a sensing electrode having one terminal; a first transistor having a gate connected to the scan line (Gate n), a source terminal connected to the data line and a drain; a second transistor of which a gate terminal is connected to the scan line (Gate n−1) of the former terminal, a source terminal is connected to the drain terminal of the first transistor, and a drain terminal is connected to the terminal of the sensing electrode; a third transistor of which a gate terminal is connected to the sensing electrode and the drain terminal of the second transistor, a drain terminal is connected to the scan line, and a source terminal is connected to the drain terminal of the first transistor and the source terminal of the second transistor; a diode of which an anode terminal is connected to the scan line (Gate n−1) of the former terminal and a cathode terminal is connected to the drain terminal of the second transistor, the sensing electrode and the gate terminal of the third transistor; and a capacitor of which one terminal is connected to the gate terminal of the third transistor, the drain terminal of the second transistor, and the cathode terminal of the diode, and the other terminal is connected to the scan line.

Preferably, the drain terminal of the third transistor may be connected to a separate power supply line, and the sensing electrode connected to the gate terminal of the third transistor may be a conductive organic material.

Preferably, the sensing electrode may be a metal or a high-concentration impurity semiconductor layer, and a transparent electrode.

Preferably, the transistors may be NMOS type transistors and formed on an insulation substrate. Also, transistor may be inverted staggered type of which a gate is firstly formed on the insulation substrate. Further, the transistors may be amorphous silicon thin film transistors, or polycrystalline or crystalline thin film transistors.

In still other example embodiments, an unevenness detecting method using an unevenness detecting apparatus for compensating for a threshold voltage including a plurality of scan lines and a plurality of data lines and a pixel circuit (e.g., pixel circuit including a fourth transistor) arranged on each point which the scan lines and the scan lines are intersected, includes: enabling a second and fourth transistor to be turned on by enabling a capacitance to be determined according to a distance between an object on which an unevenness is formed and a sensing electrode and a select signal to be transmitted through the scan line (Gate n−1) of the former terminal; enabling a pixel voltage to be decreased and initialized till the third transistor is turned off after the second and fourth transistor are turned on and simultaneously the pixel voltage is increased in a moment; increasing the pixel voltage by turning on the first and third transistor and increasing a drain voltage of the third transistor by selecting only scan line (Gate n) instead of selecting the scan line (Gate n−1) of the former terminal; and outputting an output voltage to a data line through the turned-on third transistor and a first transistor.

In still other example embodiments, an unevenness detecting method using an unevenness detecting apparatus for compensating for a threshold voltage including a plurality of scan lines and a plurality of data lines, and a pixel circuit (e.g., pixel circuit including a diode instead of a fourth transistor) arranged on each point which the scan lines and the scan lines are intersected, includes: enabling a second transistor to be turned on and a diode to be conducted by enabling a capacitance to be determined according to a distance between an object on which an unevenness is formed and a sensing electrode and a select signal to be transmitted through the scan line (Gate n−1) of the former terminal; enabling a pixel voltage to be decreased and initialized till the third transistor is turned off after the second and fourth transistor are turned on and simultaneously the pixel voltage is increased in a moment; increasing the pixel voltage by turning on the first and third transistor and increasing a drain voltage of the third transistor by selecting only scan line (Gate n) instead of selecting the scan line (Gate n−1) of the former terminal; and outputting an output voltage to a data line through the turned-on third transistor and a first transistor.

Preferably, the pixel voltage generated by increasing the drain voltage of the third transistor is determined according to a ratio $(C_{C1}/C_{C1}+C_S)$ of a capacitance $(C_S)$ determined according to a distance between the sensing electrode and the object on which the unevenness is formed and a capacitance $(C_{C1})$ of a capacitor.

Preferably, the output voltage outputted to the data line is a voltage, which subtracts the threshold of the third transistor from the increased pixel voltage.

BRIEF DESCRIPTION OF THE DRAWINGS

Example embodiments of the present invention will become more apparent by describing in detail example embodiments of the present invention with reference to the accompanying drawings, in which.

DESCRIPTION OF EXAMPLE EMBODIMENTS OF THE PRESENT INVENTION

Figure 1:
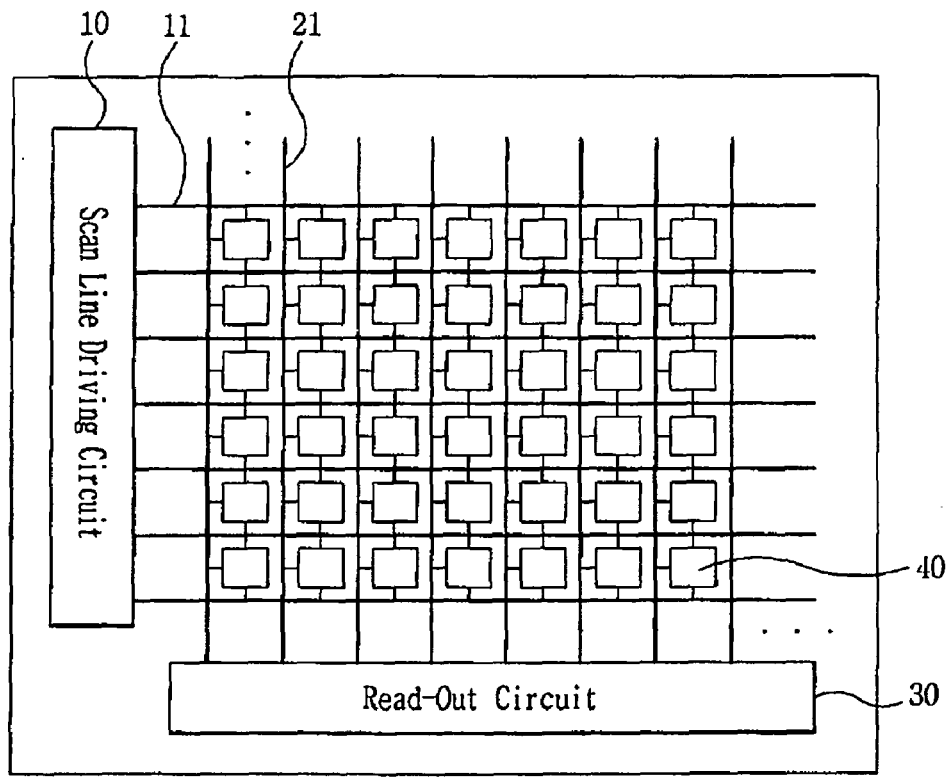
FIG. 1 is an entire schematic view illustrating an unevenness detecting apparatus having a pixel circuit according to a capacitance detection type.
Figure 2:
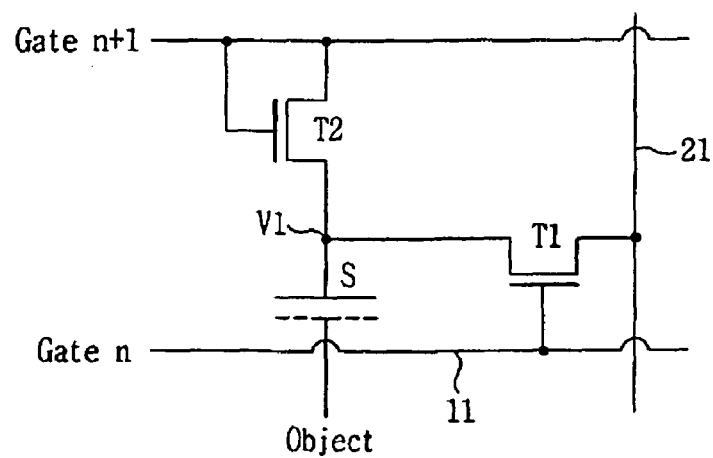
FIG. 2 is a configuration view of a pixel circuit included in an existing unevenness detecting apparatus.
Figure 3:
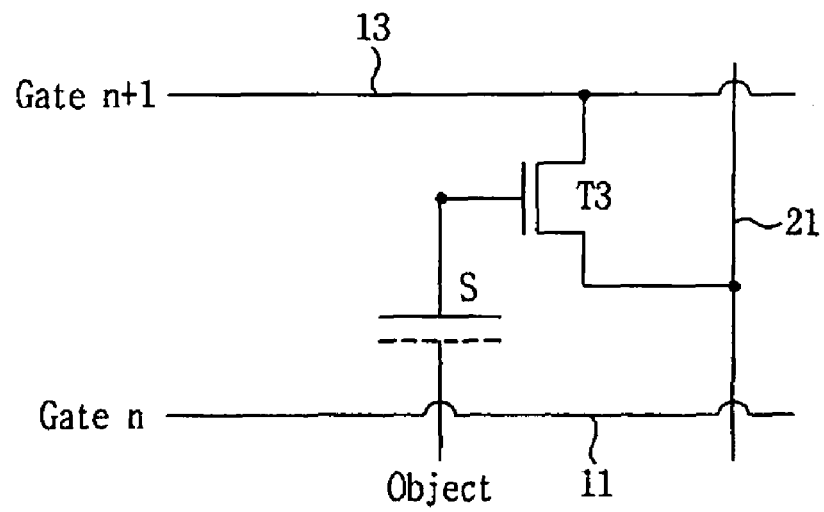
FIG. 3 is a configuration view of the existing pixel circuit having a charge amplification function.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

Hereinafter, an unevenness detecting apparatus and method using the same of the present invention will be described in detail with reference to the accompanying drawings. The embodiment will be explained in detail for enabling people who have common intellects in a corresponding field to execute the present invention.

The present invention is related to the unevenness detecting apparatus for compensating for the threshold voltage, having a plurality of scan lines and a plurality of data lines, and a pixel circuit arranged on each point which the scan lines and the data lines are intersected.

The pixel circuit included in the present invention is composed of a TFT, a capacitor and a sensing electrode. The TFT is formed on an insulation substrate and composed of amorphous or polycrystalline silicon TFT. A TFT array, polycrystalline or a crystalline silicon transistor array included in the pixel circuit of the unevenness detecting apparatus is used as a switching element. Additionally, the pixel circuit converts the unevenness such as the fingerprint into a change volume of voltage using the sensing electrode.

Figure 4:
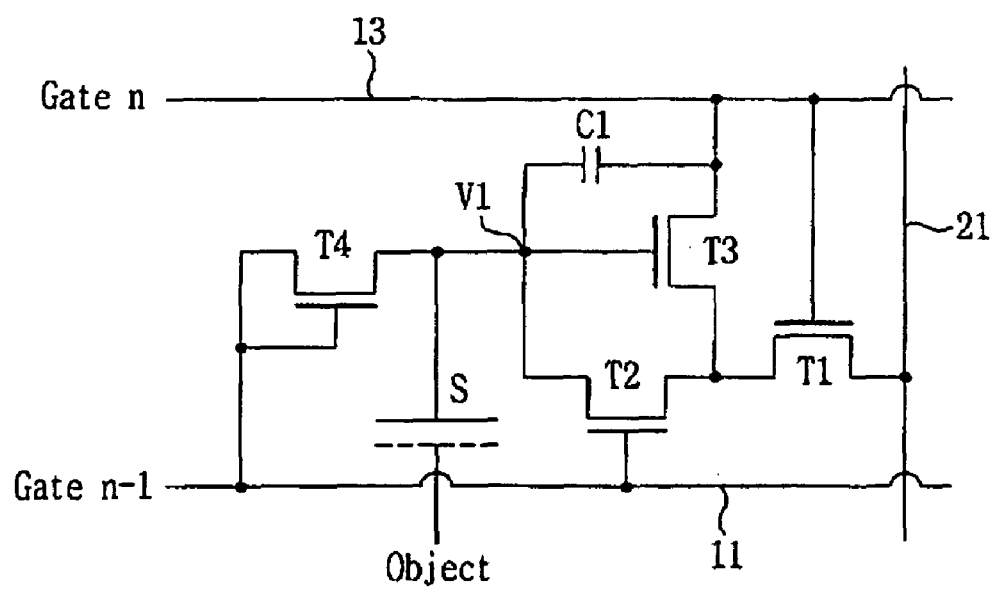
FIG. 4 is a configuration view of a pixel circuit according to an example embodiment of the present invention.

FIG. 4 is a configuration view of the pixel circuit included in the unevenness detecting apparatus for compensating for the threshold according to an example embodiment of the present invention.

As illustrated in FIG. 4, the pixel circuit included in the unevenness detecting apparatus for compensating for the threshold voltage, is composed of NMOS transistors (T1, T2, T3, T4), a sensing electrode (S) and a capacitor (C1) configured to perform a boot-strap function.

The sensing electrode (S) is provided with one terminal and performs an operation such as the capacitor interposed between the sensing electrode and the object having the unevenness such as the fingerprint. The capacitance formed between the sensing electrode (S) and the object is determined according to a distance between the sensing electrode and the object.

Preferably, the sensing electrode is formed with a conductive organic material, but is formed with a metal or a high-concentration impurity semiconductor layer. Meanwhile, it is desirable that the sensing electrode (S) is a transparent electrode.

Meanwhile, a coupling relation among 4 transistors, the capacitor, and the sensing electrode will be now explained.

The first transistor (T1) is provided with a gate, a source and a drain terminal, where the gate terminal is connected to a scan line (denoted as "Gate n" in FIG. 4) 13 and the source terminal is connected to the data line 21. The first transistor (T1) performs a function for selecting respective pixel, by outputting a final pixel voltage to the data line 21.

The drain terminal of the first transistor (T1) is connected to the source terminal of the second transistor (T2). In addition, the gate terminal of the second transistor (T2) is connected to the scan line (denoted as "Gate n−1" in FIG. 4) of the former terminal located in the former terminal of the scan line (described as "Gate n" in FIG. 4) 13, and the drain terminal is connected to the terminal of the sensing electrode (S). The second transistor (T2) is connected between the gate terminal of a third transistor (T3) to be described below and a source terminal, and performs a function of initializing a pixel voltage (V1) to a threshold voltage of the third transistor (T3).

The drain terminal of the first transistor (T1) and the source terminal of the second transistor are connected to the source terminal of the third transistor (T3). In addition, the drain terminal of the third transistor (T3) is connected to the scan line (denoted as "Gate n" in FIG. 4) 13, and the gate terminal is connected to the terminal of the sensing electrode (S) and the drain terminal of the second transistor (T2). The third transistor (T3) performs a function of performing a current amplification on a signal according to an input voltage of the gate terminal.

Meanwhile, in the third transistor (T3), as illustrated above, the drain terminal is connected to the scan line (denoted as "Gate n" in FIG. 4), but the drain terminal may be connected to a special power supply line in a different configuration.

The drain terminal of the second transistor (T2), the gate terminal of the third transistor (T3) and the terminal of the sensing electrode (S) are connected to a source terminal of a fourth transistor (T4). In addition, a gate terminal and the source terminal of the fourth transistor (T4) are connected to the scan line of the former terminal (described as "Gate n−1" in FIG. 4). The fourth transistor (T4) supplies auxiliary a power supply to respective pixel.

Finally, the gate terminal of the third transistor (T3), the drain terminal of the second transistor, the source terminal of the fourth transistor and the terminal of the sensing electrode (S) are connected to one terminal of the capacitor (C1). In addition, the other terminal of the capacitor (C1) is connected to the scan line (denoted as "Gate n" in FIG. 4).

Transistors T1, T2, T3 and T4 included in the pixel circuit, according to the present invention formed as the above-described configuration, are NMOS type transistors, and the transistors are formed on the insulation substrate and inverted staggered type of which respective gate terminal is previously formed on the insulation substrate. Meanwhile, it is desirable that the transistors are amorphous silicon TFTs, or polycrystalline or crystalline TFTs.

An operation of the pixel circuit included in the unevenness detecting apparatus for compensating for the threshold voltage formed in the above configuration will be explained with reference to FIG. 6.

Figure 6:
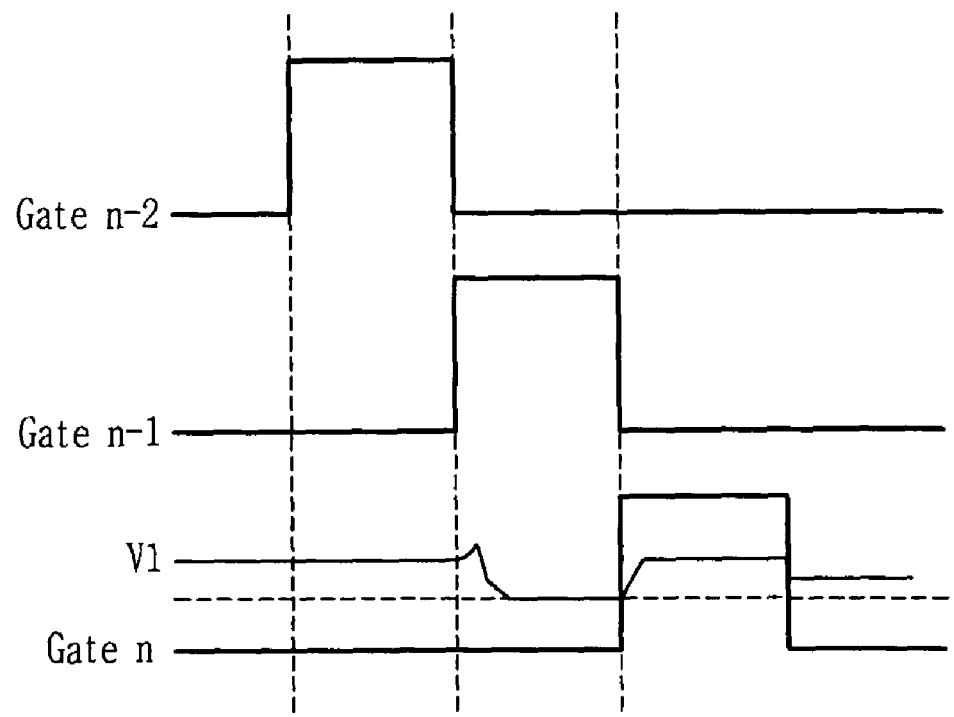
FIG. 6 is a timing view for driving a pixel circuit according to an example embodiment of the present invention.

FIG. 6 is a timing view for driving the pixel circuit included in the unevenness detecting apparatus for compensating for the threshold voltage according to an example embodiment of the present invention.

First, a capacitance of the capacitor formed between the object on which the unevenness such as fingerprints of human being and the sensing electrode (S) is determined according to a distance between the object and the sensing electrode (S). In this state, a select signal is transmitted to the gate terminal of the second transistor T2, the gate terminal and the drain terminal of the fourth transistor (T4) through the scan line (Gate n−1) of the former terminal. Then, the second and fourth transistor T2 and T4 are turned on.

As described above, when the second and fourth transistor T2 and T4) are turned on, a pixel voltage (V1) is increased in a moment as illustrated in FIG. 6 as if a peak point were formed. However, the pixel voltage is gradually decreased till the third transistor (T3) is turned off.

When a gate voltage of the third transistor (T3), i.e., a voltage difference between the pixel voltage (V1) and a non-select signal voltage (VOFF) applied to the scan line (Gate n) connected to a drain electrode of the third transistor (T3) becomes a threshold voltage of the third transistor (T3), the third transistor (T3) is turned off.

Accordingly, in a point that the non-select signal is applied to the scan line (Gate n−1) of the former terminal, the pixel voltage is initialized to a voltage as much as a difference between the threshold voltage of the third transistor (T3) and the non-select signal voltage (VOFF).

As described above, when the pixel voltage is initialized, the scan line (Gate n−1) of the former terminal is non-selected and only scan line (Gate n) is selected. Then, the second and fourth transistor (T2, T4) are turned off and the first and third transistor (T1, T3) are turned on. In addition, the pixel voltage (V1) is more and more increased up to a predetermined electric potential as illustrated in FIG. 6 at the same time the voltage of the drain terminal of the third transistor (T3) connected to the scan line (Gate n) is increased.

As described above, when a select signal is applied to the scan line (Gate n9), the first transistor (T1) is turned on and the drain voltage of the third transistor (T3) is increased, then a bootstrap is generated through the capacitor (C1). In this case, a ratio of coupling is determined according to a capacitance of the capacitor formed between the capacitance of the capacitor (C1) and the capacitor formed between the object and the sensing electrode (S).

In other words, a pixel voltage generated by increasing the drain voltage of the third transistor is determined according to a ratio ($C_{C1}/(C_{C1}+C_S)$) of the capacitance determined by the distance between the sensing electrode (S) and the object on which an unevenness is formed, and the capacitance ($C_{C1}$) of a capacitor.

In the above state, the third transistor (T3) and the first transistor (T1) are conducted and electrically connected, and an output voltage is outputted corresponding to the pixel voltage, for which the threshold voltage is compensated through the data line connected to the source terminal of the first transistor (T1).

The output voltage outputted to the data line is outputted as a voltage, which subtracts the threshold voltage of the third transistor (T3) from the increased pixel voltage as illustrated in FIG. 6. The pixel voltage outputted to the data line is outputted in a state for compensating for the threshold voltage of the third transistor (T3).

Figure 5:
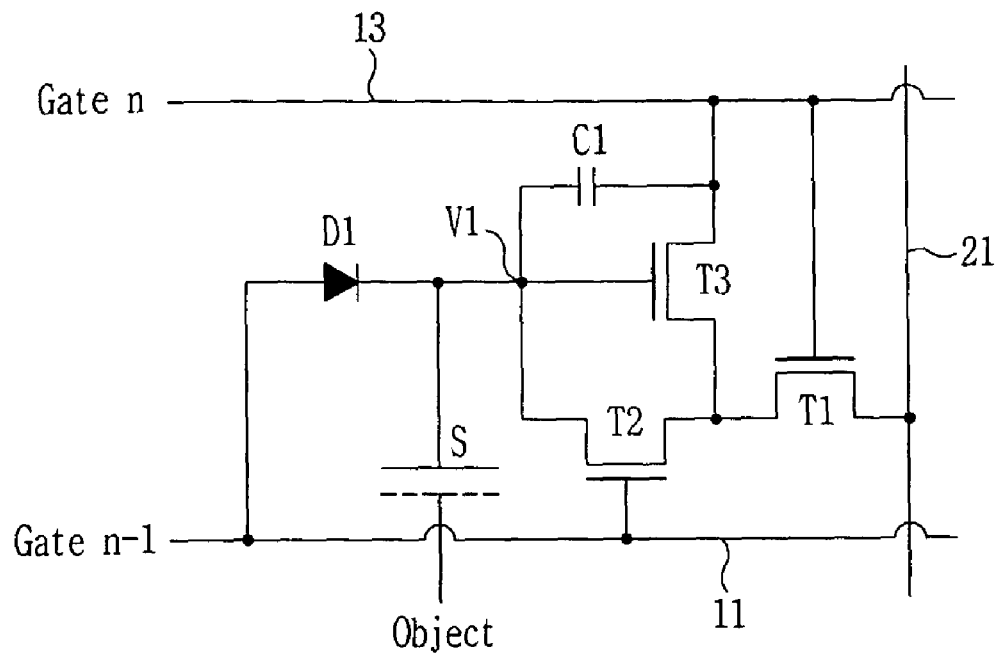
FIG. 5 is a configuration view of a pixel circuit according to another example embodiment of the present invention.

The pixel circuit included in the unevenness detecting apparatus for compensating for the threshold voltage is operated by being composed of 4 transistors, the capacitor and the sensing electrode, FIG. 5 is a view illustrating another construction of the pixel circuit included in the unevenness detecting apparatus for compensating for the threshold voltage according to the present invention.

As illustrated in FIG. 5, the pixel circuit, according to another example embodiment of the present invention, is structurally different from a point of using the diode (D1) instead of the fourth transistor (denoted as "T4" in FIG. 4) configured to supply auxiliary power in comparison with FIG. 4.

Accordingly, an element coupling and driving method, except for using the diode instead of the fourth transistor (T4), is the same as the embodiments explained with reference to FIGS. 4 and 6, the detailed explanation thereof will be omitted.

In the pixel circuit included in the unevenness detecting apparatus for compensating for the threshold voltage according to the present invention, the threshold voltage of the third transistor (T3) operated as the source follow transistor for the purpose of controlling a final output is sensed and initialized to a reference voltage of a pixel. Consequently, even though the threshold voltage is changed according as a used time of the elements is increased, an output of the pixel due to a signal is not changed and a high-quality image signal may be obtained.

As described above, according to the example embodiment of the present invention, the pixel circuit may fix the brightness of an image obtained due to time, because an output of the pixel circuit corresponding to a signal voltage is not varied due to a characteristic change of the transistor as an output element. Accordingly, the pixel circuit has an effect of lengthening the life span of the unevenness detecting apparatus including the pixel circuit, by reducing an output change of the pixel circuit generated from the deterioration of the transistor due to the long time use.

Further, according to the unevenness detecting apparatus using the pixel circuit, in a bootstrap capacitor each pixel, since a change of a capacitance according to a weak change of high and low of the unevenness is appeared as a change of a great voltage by the bootstrap, the evenness detecting apparatus can obtain a high-sensitivity image even case of high precision display of the unevenness detecting sensor.

Further, the unevenness detecting apparatus according to the present invention has an advantage of being variously applied to a scientific and commercial field, according as the unevenness detecting apparatus has characteristics of superior sensitivity and life span in comparison with another TFT unevenness detecting apparatuses which have been ever developed.

While the example embodiments of the present invention and their advantages have been described in detail, it should be understood that various changes, substitutions and alterations may be made herein without departing from the scope of the invention.

What is claimed is:

1. An unevenness detecting apparatus for compensating a threshold voltage variation including a plurality of scan lines and a plurality of data lines; and a pixel circuit arranged on each point which the scan lines and the data lines are intersected, wherein the pixel circuit includes:

a sensing electrode having one terminal;

a first transistor having a gate terminal connected to a scan line [Gate n], a source terminal connected to the data line and a drain terminal;

a second transistor of which a gate terminal is connected to a scan line [Gate n−1] of a former pixel row, a source terminal is directly connected to the drain terminal of the first transistor, and a drain terminal is connected to the terminal of the sensing electrode;

a third transistor of which a gate terminal is connected to the sensing electrode and the drain terminal of the second transistor, a drain terminal is connected to the scan line [Gate n], and a source terminal is connected to the drain terminal of the first transistor and the source terminal of the second transistor;

a fourth transistor of which a gate terminal and a drain terminal are connected to the scan line [Gate n−1] of the former pixel row, and a source terminal is connected to the drain terminal of the second transistor, the sensing electrode and the gate terminal of the third transistor; and a capacitor of which one terminal is connected to a gate terminal of the third transistor, a drain terminal of the second transistor, a source terminal of the fourth transistor, and the sensing electrode, and the other terminal is connected to the scan line [Gate n].

2. The unevenness detecting apparatus of claim 1, wherein the drain terminal of the third transistor is connected to a special power supply line.

3. The unevenness detecting apparatus of claim 2, wherein the sensing electrode connected to the gate terminal of the third transistor may be a conductive organic material.

4. The unevenness detecting apparatus of claim 3, wherein the sensing electrode may be a metal or a high-concentration impurity semiconductor layer.

5. The unevenness detecting apparatus of claim 4, wherein the sensing electrode may be a transparent electrode.

6. The unevenness detecting apparatus of claim 1, wherein the transistors may be NMOS type transistors.

7. The unevenness detecting apparatus of claim 6, wherein the transistors are formed on an insulation substrate and are of an inverted staggered type of which a gate is previously formed on the insulation substrate.

8. The unevenness detecting apparatus of claim 7, wherein the transistors may be amorphous silicon TFTs.

9. The unevenness detecting apparatus of claim 7, wherein the transistors may polycrystalline or crystalline silicon TFTs.

10. An unevenness detecting method for compensating threshold voltage variation, using the unevenness detecting apparatus of claim 1 including a plurality of scan lines and a plurality of data lines; and a pixel circuit arranged on each point that the scan lines and the data lines are intersected, comprising:

enabling the second and fourth transistors to be turned on, by determining a capacitance according to a distance between an object on which an unevenness is formed and the sensing electrode, and transmitting a select signal through the scan line [Gate n−1] of the former pixel row;

enabling a pixel voltage to be increased in a moment the second and fourth transistors are turned off and to be decreased and initialized till the third transistor is turned off;

enabling the first and third transistors to be turned on by non-selecting the scan line [Gate n−1] of the former pixel row and selecting only scan line [Gate n], thereby increasing a drain voltage of the third transistor and thus increasing the pixel voltage; and outputting an output voltage to the data line through the turned-on third transistor and first transistor.

11. The unevenness detecting method of claim 10, wherein the pixel voltage generated from increasing the drain voltage of the third transistor is determined in the ratio ($C_{C1}/(C_{C1}+C_S)$) of a capacitance ($C_S$) determined by a distance between the sensing electrode and an object on which an unevenness is formed and a capacitance ($C_{C1}$) of a capacitor.

12. The unevenness detecting method of claim 11, wherein the output voltage outputted to the data line is a voltage, which subtracts the threshold voltage of the third transistor from the increased pixel voltage.

* * * * *